(12) United States Patent
Doney et al.

(10) Patent No.: US 12,483,538 B2
(45) Date of Patent: *Nov. 25, 2025

(54) METHOD, APPARATUS, AND COMPUTER-READABLE MEDIUM FOR SECURED DATA TRANSFER OVER A DECENTRALIZED COMPUTER NETWORK

(71) Applicant: Securrency, Inc., Annapolis, MD (US)

(72) Inventors: George Daniel Doney, Riva, MD (US); Ihor Yermakov, Arlington, VA (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 194 days.

This patent is subject to a terminal disclaimer.

(21) Appl. No.: 18/243,997

(22) Filed: Sep. 8, 2023

(65) Prior Publication Data
US 2023/0421543 A1    Dec. 28, 2023

Related U.S. Application Data

(63) Continuation-in-part of application No. 17/313,105, filed on May 6, 2021, now Pat. No. 11,757,639.

(60) Provisional application No. 63/030,387, filed on May 27, 2020.

(51) Int. Cl.
H04L 29/06    (2006.01)
H04L 9/00    (2022.01)
H04L 9/40    (2022.01)

(52) U.S. Cl.
CPC ............ *H04L 63/0442* (2013.01); *H04L 9/50* (2022.05)

(58) Field of Classification Search
CPC ... H04L 9/3213; H04L 9/0825; H04L 9/0861; H04L 9/50; H04L 2209/56; H04L 9/3247; H04L 9/3239; G06Q 20/0658; G06Q 20/3829; G06Q 2220/00; G06Q 20/02; G06Q 20/223
See application file for complete search history.

(56) References Cited

U.S. PATENT DOCUMENTS

| | | |
|---|---|---|
| 10,193,696 B2 | 1/2019 | Struttmann et al. |
| 10,489,597 B2 | 11/2019 | Safford et al. |
| 10,540,654 B1* | 1/2020 | James .................. G06Q 20/223 |
| 10,673,626 B2 | 6/2020 | Sandberg-Maitland et al. |
| 10,735,202 B2 | 8/2020 | Jayachandran et al. |
| 10,887,097 B1* | 1/2021 | Lee ....................... H04L 9/3239 |
| 11,159,307 B2 | 10/2021 | Bathen et al. |
| 11,194,837 B2 | 12/2021 | Vo et al. |
| 11,200,569 B1* | 12/2021 | James .................. G06Q 20/381 |
| 11,250,423 B2 | 2/2022 | Heyner |
| 11,250,466 B2 | 2/2022 | Soundararajan et al. |

(Continued)

*Primary Examiner* — Mahfuzur Rahman
(74) *Attorney, Agent, or Firm* — NEO IP

(57) ABSTRACT

A method and apparatus for secured, peer-to-peer transfer of data rights over a computer network, the method being accomplished by a decentralized computing system including a distributed ledger platform and an off-chain data host platform. A data owner authorizes the minting and distribution of an on-chain authorization token using the distributed ledger. The authorization token includes primary and secondary encryption levels to ensure secure data transfer. The authorization tokens are used to track data access rights, enforce access policies, and control distribution of encryption keys transferred between the data owner, an administrator, a recipient, and/or a delegate.

20 Claims, 10 Drawing Sheets

(56) References Cited

U.S. PATENT DOCUMENTS

| | | | |
|---|---|---|---|
| 11,301,460 B2 | 4/2022 | Rich et al. | |
| 11,308,487 B1* | 4/2022 | Foster | G06Q 20/3829 |
| 11,334,883 B1* | 5/2022 | Auerbach | G06Q 20/223 |
| 11,488,147 B2 | 11/2022 | Sheng et al. | |
| 11,488,161 B2 | 11/2022 | Soundararajan et al. | |
| 11,501,370 B1* | 11/2022 | Paya | G06Q 20/3676 |
| 11,551,191 B2 | 1/2023 | McNamara et al. | |
| 2018/0232526 A1* | 8/2018 | Reid | G06F 21/6218 |
| 2020/0084018 A1* | 3/2020 | Pande | H04L 9/0844 |
| 2020/0412521 A1* | 12/2020 | Shi | H04L 9/06 |
| 2021/0037060 A1* | 2/2021 | Robison | H04L 63/123 |
| 2021/0042735 A1 | 2/2021 | Majidi et al. | |
| 2021/0143986 A1* | 5/2021 | Gouget | H04L 9/085 |
| 2021/0192501 A1 | 6/2021 | McNamara et al. | |
| 2021/0201328 A1* | 7/2021 | Gunther | G06Q 20/322 |
| 2021/0304200 A1* | 9/2021 | Doney | H04L 9/50 |
| 2021/0319119 A1* | 10/2021 | Hadi | H04L 9/50 |
| 2021/0377028 A1* | 12/2021 | Doney | G06Q 20/223 |
| 2021/0377263 A1 | 12/2021 | Law | |
| 2022/0040557 A1* | 2/2022 | Tran | G06F 1/163 |
| 2022/0051261 A1 | 2/2022 | Vetas | |
| 2022/0200973 A1* | 6/2022 | Tola | H04L 63/0428 |
| 2022/0270080 A1 | 8/2022 | Yantis et al. | |
| 2023/0360042 A1* | 11/2023 | Doney | G06Q 20/065 |

* cited by examiner

METHOD, APPARATUS, AND COMPUTER-READABLE MEDIUM FOR SECURED DATA TRANSFER OVER A DECENTRALIZED COMPUTER NETWORK

CROSS REFERENCES TO RELATED APPLICATIONS

This application is a continuation-in-part of U.S. application Ser. No. 17/313,105, filed May 6, 2021, which claims priority to and the benefit of U.S. Provisional Application No. 63/030,387 filed May 27, 2020, each of which is incorporated herein by reference in its entirety.

BACKGROUND OF THE INVENTION

1. Field of the Invention

The present invention relates to the transfer of data on decentralized networks, and more specifically to securing data for transfer over decentralized networks.

2. Description of the Prior Art

It is generally known in the prior art to provide platforms for decentralized data transfer.

Prior art patent documents include the following:

US Patent Publication No. 2022/0051261 for Processes and systems of blockchain with verification through a consortium of stakeholders by inventor Vetas, filed May 29, 2021, and published Feb. 17, 2022, is directed to a management system having a blockchain structure. The system includes a consortium of stakeholder computers connected to a platform. The consortium of stakeholders providing user inputted data associated with product providence. The platform is integrated with a blockchain database to verify and manage user inputted data. The platform is configured to validate and assign values to the user inputted data to connect to related data within the blockchain database. A user interface is configured to display qualified data based on user search queries and focus search results to provide a roadmap of the data relevant to a particular product or value.

US Patent Publication No. 2021/0377263 for Distributed computing systems for strong user authentication and related methods by inventor Law, filed Apr. 22, 2021, and published Dec. 2, 2021, is directed to a distributed computing system is used to form a login network to verify the identity of users. The login network uses biometric authentication on a user device to digitally sign a payload, which is sent to the login network for verification. The login network executes the verification using blockchain computing architecture, which is decentralized. The login network provides strong customer authentication, decentralization of data and authentication, a trusted identity service, and privacy and control of the user data by the user.

U.S. Pat. No. 11,250,466 for Systems and methods for using secured representations of user, asset, and location distributed ledger addresses to prove user custody of assets at a location and time by inventor Soundararajan, filed Jul. 30, 2018, and issued Feb. 15, 2022, is directed to systems and methods for using a distributed ledger network and devices that transmit secured representations of distributed ledger addresses to prove the custody of an asset by a user at a particular location and time. In some implementations, a method includes: transmitting to a server system operating as a node on a distributed ledger network: a first secured representation of a distributed ledger address associated with a first location; a second secured representation of a distributed ledger address associated with an asset; and a third secured representation of a distributed ledger address associated with a user; and receiving a confirmation message from the server system.

U.S. Pat. No. 11,250,423 for Encapsulated security tokens for electronic transactions by inventor Heyner, filed Aug. 22, 2019, and issued Feb. 15, 2022, is directed to functional data for use in one or more digital transactions secured by using an encapsulated security token (EST). In certain embodiments, the EST is created by encapsulating digital data including the functional data using at least two cryptographic systems of two parties. The encapsulation and subsequent de-encapsulation can utilize cryptographic systems of the parties that involve a private key for signing and decryption and a public key for encryption and signature verification. If constructed carefully over a series of rigorous events, the resulting EST can be practically impossible to counterfeit. In addition, a propagation of rights can be tracked for auditing and rights can be easily terminated or modified.

U.S. Pat. No. 11,159,307 for Ad-hoc trusted groups on a blockchain by inventor Bathen, filed Aug. 8, 2018, and issued Oct. 26, 2021, is directed to an example operation may include one or more of identifying a group of blockchain member devices attempting to establish a trusted group communication channel, assigning each of the blockchain member devices public/private key pairs, publishing the public keys of the blockchain member devices in a list, identifying a request from a first blockchain member device requesting a private key, associated with a second blockchain member device, be applied to a predetermined nonce value, responsive to identifying a response to the request, verifying, via a public key assigned to the first blockchain member device, that the second blockchain member device is a trusted member of the group of blockchain member devices, and responsive to verifying the second blockchain member device is a trusted member of the group of blockchain member devices, permitting communication between the first blockchain member device and the second blockchain member device on the trusted group communication channel.

U.S. Pat. No. 10,735,202 for Anonymous consent and data sharing on a blockchain by inventor Jayachandran, filed Jul. 24, 2017, and issued Aug. 4, 2020, is directed to an example operation may include one or more of storing a user profile in a blockchain by an authorized member of the blockchain, receiving a request by another authorized member of the blockchain to access the user profile, identifying the request for the user profile is from the another authorized member of the blockchain, creating a signed message that includes consent to share the user profile with the another authorized member of the blockchain, and transmitting the signed message to the another authorized member of the blockchain, and wherein an exchange of the user profile between the blockchain members is performed without revealing blockchain member identities of the authorized member of the blockchain and the another authorized member of the blockchain to any of the blockchain members.

U.S. Pat. No. 10,673,626 for Threshold secret share authentication proof and secure blockchain voting with hardware security modules by inventor Sandberg-Maitland, filed Dec. 31, 2018, and issued Jun. 2, 2020, is directed to an encryption-protected decentralized and replicated blockchain file storage system maintained and managed by a channel of peers, the invention creates the additional levels of trust that are needed for peer voter authentication and transaction proposal endorsement. The invention effectively excludes hostile agents from influencing or impersonating legitimate voter peers through the mathematical strength of the K-of-N mechanism based on secret sharing with cryptographic hashing. In a further embodiment an extension to nested signatures is disclosed to enforce signing order.

U.S. Pat. No. 10,489,597 for Blockchain verification of network security service by inventor Safford, filed Mar. 28, 2017, and issued Nov. 26, 2019, is directed to a system may include a communication port to exchange information with a client device associated with an industrial control system. A network security server coupled to the communication port may include a computer processor adapted to provide a network security service for the client device. The computer processor may further be adapted to record security information about the client device via a blockchain verification process (e.g., by registering a validation result within a distributed ledger). The network security service might comprise, for example, an integrity attestation service providing software verification for the client device.

SUMMARY OF THE INVENTION

The present invention relates to systems and processes for secure, trustless data transfer and data rights exchange through the issuance and use of a data authorization tokens in a decentralized framework to enable authorized participating parties to view sensitive data.

It is an object of this invention to provide a data structure such that data owners disseminate data to counterparties such that counterparties only access data when authorized and with full accountability.

In one embodiment, the present invention includes a method of secure data transfer over a distributed ledger, comprising an issuing party of a decentralized computer platform generating a key, the issuing party encrypting data with the key using a symmetric encryption algorithm to create encrypted data, the issuing party encrypting the key using an asymmetric encryption algorithm to create an access key, the issuing party transferring the encrypted data to a data host platform, the data host platform creating a pointer to indicate the location of the encrypted data on the data host platform and the data host platform transferring the pointer to a distributed ledger, the issuing party transferring the access key to the distributed ledger, the issuing party transmitting a request to the distributed ledger to create an authorization token, the distributed ledger creating the authorization token including a unique token identifier, the access key, and the pointer, the distributed ledger transferring the authorization token to a receiving party, the receiving party transmitting a request to the data host platform to access the encrypted data, the data host platform encrypting the encrypted data with the asymmetric encryption algorithm to create twice-encrypted data upon receiving the request to access the encrypted data, the data host platform transferring the twice-encrypted data to the receiving party, the receiving party decrypting the twice-encrypted data using the asymmetric encryption algorithm to produce the encrypted data, the receiving party decrypting the access key using the asymmetric encryption algorithm to produce the key, and the receiving party decrypting the encrypted data with the key using the symmetric encryption algorithm to access the data.

In another embodiment, the present invention includes a system for secure data transfer over a decentralized computer network, comprising a distributed ledger, a data host platform, an issuing client interface, a receiving client interface, and an administrative client interface, wherein the issuing client interface is configured to generate a symmetric encryption key, wherein the symmetric encryption key is used to encrypt the data to create encrypted data, wherein the issuing client interface uses the public key of the receiving client interface and an asymmetric encryption algorithm to encrypt the symmetric encryption key to produce an access key, wherein the issuing client interface transfers the access key to the distributed ledger, wherein the data host platform is in network communication with the issuing client interface, wherein the data host platform receives encrypted data from the issuing client interface, wherein the data host platform is configured to generate a pointer upon receiving data from the issuing client interface, wherein the data host platform transfers the pointer to the distributed ledger, wherein the distributed ledger includes an authorization registry, wherein the issuing client interface transfers a request to the authorization registry to issue an authorization token, wherein the authorization token includes the pointer, the access key, and a unique token identifier, wherein the distributed ledger is configured to transfer the authorization token to the receiving client interface immediately upon issuing the authorization token, wherein the receiving client interface uses a private key of the receiving client interface and the asymmetric encryption algorithm to decrypt the access key to produce the key, wherein upon receiving the authorization token from the distributed ledger, the receiving party transmits the token identifier to the distributed ledger with a request to access the encrypted data, wherein the request is granted, wherein the distributed ledger includes a session registry, wherein, upon the granting of the request, the distributed ledger creates a session in the session registry and a session identifier is sent to the receiving client interface, wherein the data host platform receives the session identifier and the pointer from the receiving client interface, wherein the data host platform verifies the session identifier with the distributed ledger, wherein upon verification of the session identifier, the data host platform encrypts the encrypted data with the public key of the receiving client interface and the asymmetric encryption algorithm to create twice-encrypted data, wherein the receiving client interface decrypts the twice-encrypted data using the private key of the receiving client interface and the asymmetric encryption algorithm, wherein the receiving client interface decrypts the encrypted data using the key to access the data, and wherein the administrator client interface is configured to monitor the session registry and the authorization registry.

In yet another embodiment, the present invention includes a method of secure data transfer over a distributed ledger, comprising an issuing party of a decentralized computer platform generating a key, the issuing party encrypting data with the key using a symmetric encryption algorithm to create encrypted data, the issuing party encrypting the key using an asymmetric encryption algorithm to create an access key, the issuing party transferring the encrypted data to a data host platform, the data host platform creating a pointer to indicate the location of the encrypted data on the data host platform and the data host platform transferring the pointer to a distributed ledger, the issuing party transferring the access key to the distributed ledger, the issuing party transmitting a request to the distributed ledger to create an authorization token, the distributed ledger creating the authorization token including a unique token identifier, the access key, and the pointer, the distributed ledger transferring the authorization token to a receiving party, the receiving party transmitting a request to the data host platform to access the encrypted data, the data host platform encrypting the encrypted data with the asymmetric encryption algorithm to create twice-encrypted data upon receiving the request to access the encrypted data, the data host platform transferring the twice-encrypted data to the receiving party, the receiving party decrypting the twice-encrypted data using the asymmetric encryption algorithm to produce the encrypted data, the receiving party decrypting the access key using the asymmetric encryption algorithm to produce the key, the receiving party decrypting the encrypted data with the key using the symmetric encryption algorithm to access the data, the receiving party generating a delegate key, wherein the receiving party encrypts the data using the delegate key to create encrypted delegate data, the receiving party encrypting the delegate key using a delegate asymmetric encryption algorithm to create a delegate access key, the receiving party transferring the encrypted delegate data to the data host platform, the data host platform creating a delegate pointer to indicate the location of the encrypted delegate data on the data host platform, the data host platform transferring the delegate pointer to the distributed ledger, the receiving party transferring the delegate access key to the distributed ledger, the receiving party transmitting a request to the distributed ledger to create a delegate authorization token, the distributed ledger creating the delegate authorization token including a unique delegate token identifier, the delegate access key, and the delegate pointer, the distributed ledger transferring the delegate authorization token to a delegate party, the delegate party transmitting a request to the data host platform to access the encrypted delegate data, the data host platform, upon receiving the request to access the encrypted delegate data, encrypting the encrypted delegate data with the delegate asymmetric encryption algorithm to create twice-encrypted delegate data, the data host platform transferring the twice-encrypted delegate data to the delegate party, the delegate party decrypting the twice-encrypted data using the delegate asymmetric encryption algorithm to produce the encrypted delegate data, the delegate party decrypting the delegate access key using the delegate asymmetric encryption algorithm to produce the delegate key, and the delegate party decrypting the encrypted delegate data with the delegate key to access the data.

These and other aspects of the present invention will become apparent to those skilled in the art after a reading of the following description of the preferred embodiment when considered with the drawings, as they support the claimed invention.

DETAILED DESCRIPTION

Figure 1:
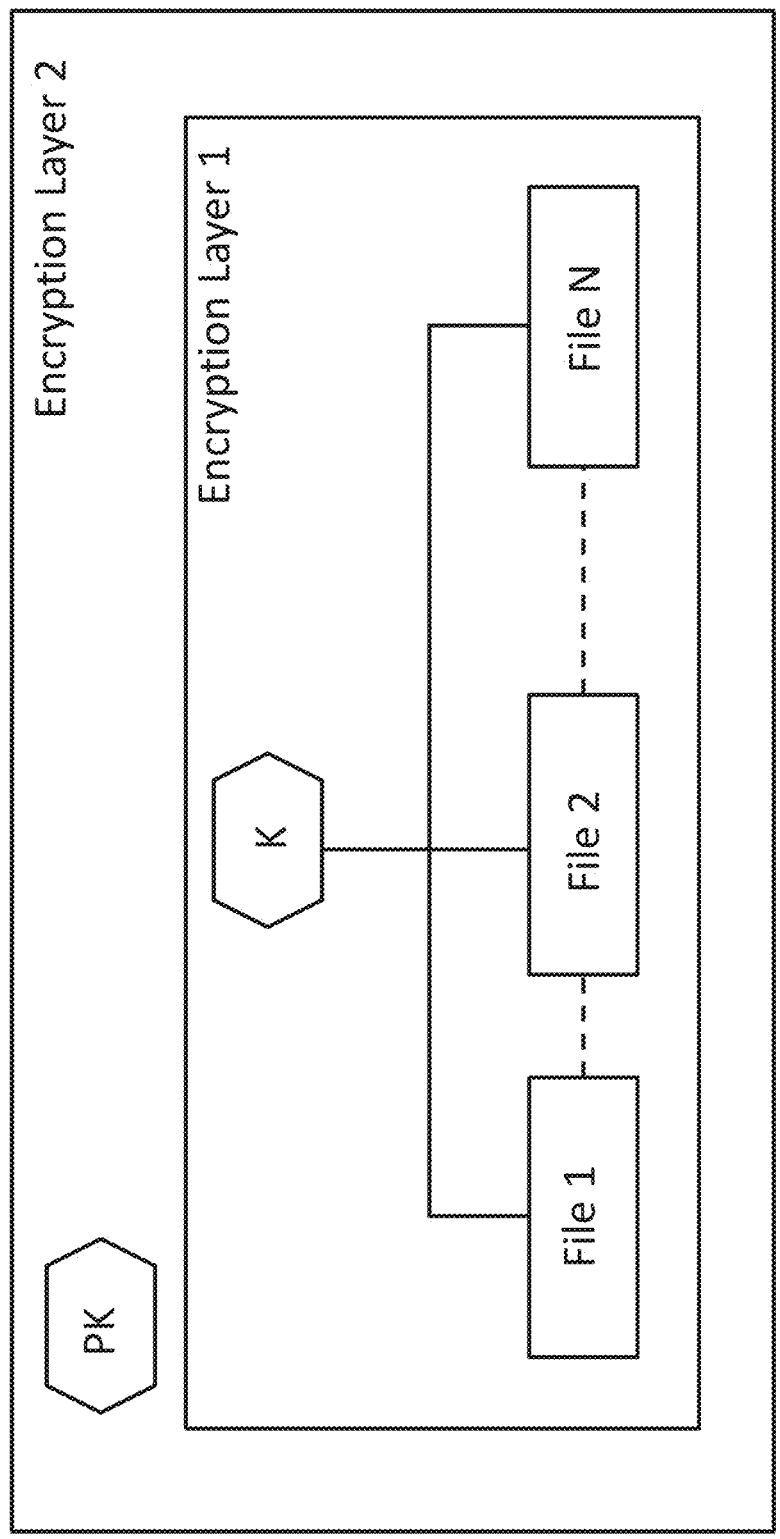
FIG. 1 is a block diagram of an encryption architecture according to one embodiment of the present invention.

The present invention is generally directed to systems and processes for secure, trustless data transfer and data rights exchange through the issuance and use of a data authorization tokens in a decentralized framework to enable authorized participating parties to view sensitive data.

In one embodiment, the present invention includes a method of secure data transfer over a distributed ledger, comprising an issuing party of a decentralized computer platform generating a key, the issuing party encrypting data with the key using a symmetric encryption algorithm to create encrypted data, the issuing party encrypting the key using an asymmetric encryption algorithm to create an access key, the issuing party transferring the encrypted data to a data host platform, the data host platform creating a pointer to indicate the location of the encrypted data on the data host platform and the data host platform transferring the pointer to a distributed ledger, the issuing party transferring the access key to the distributed ledger, the issuing party transmitting a request to the distributed ledger to create an authorization token, the distributed ledger creating the authorization token including a unique token identifier, the access key, and the pointer, the distributed ledger transferring the authorization token to a receiving party, the receiving party transmitting a request to the data host platform to access the encrypted data, the data host platform encrypting the encrypted data with the asymmetric encryption algorithm to create twice-encrypted data upon receiving the request to access the encrypted data, the data host platform transferring the twice-encrypted data to the receiving party, the receiving party decrypting the twice-encrypted data using the asymmetric encryption algorithm to produce the encrypted data, the receiving party decrypting the access key using the asymmetric encryption algorithm to produce the key, and the receiving party decrypting the encrypted data with the key using the symmetric encryption algorithm to access the data.

In another embodiment, the present invention includes a system for secure data transfer over a decentralized computer network, comprising a distributed ledger, a data host platform, an issuing client interface, a receiving client interface, and an administrative client interface, wherein the issuing client interface is configured to generate a symmetric encryption key, wherein the symmetric encryption key is used to encrypt the data to create encrypted data, wherein the issuing client interface uses the public key of the receiving client interface and an asymmetric encryption algorithm to encrypt the symmetric encryption key to produce an access key, wherein the issuing client interface transfers the access key to the distributed ledger, wherein the data host platform is in network communication with the issuing client interface, wherein the data host platform receives encrypted data from the issuing client interface, wherein the data host platform is configured to generate a pointer upon receiving data from the issuing client interface, wherein the data host platform transfers the pointer to the distributed ledger, wherein the distributed ledger includes an authorization registry, wherein the issuing client interface transfers a request to the authorization registry to issue an authorization token, wherein the authorization token includes the pointer, the access key, and a unique token identifier, wherein the distributed ledger is configured to transfer the authorization token to the receiving client interface immediately upon issuing the authorization token, wherein the receiving client interface uses a private key of the receiving client interface and the asymmetric encryption algorithm to decrypt the access key to produce the key, wherein upon receiving the authorization token from the distributed ledger, the receiving party transmits the token identifier to the distributed ledger with a request to access the encrypted data, wherein the request is granted, wherein the distributed ledger includes a session registry, wherein, upon the granting of the request, the distributed ledger creates a session in the session registry and a session identifier is sent to the receiving client interface, wherein the data host platform receives the session identifier and the pointer from the receiving client interface, wherein the data host platform verifies the session identifier with the distributed ledger, wherein upon verification of the session identifier, the data host platform encrypts the encrypted data with the public key of the receiving client interface and the asymmetric encryption algorithm to create twice-encrypted data, wherein the receiving client interface decrypts the twice-encrypted data using the private key of the receiving client interface and the asymmetric encryption algorithm, wherein the receiving client interface decrypts the encrypted data using the key to access the data, and wherein the administrator client interface is configured to monitor the session registry and the authorization registry.

In yet another embodiment, the present invention includes a method of secure data transfer over a distributed ledger, comprising an issuing party of a decentralized computer platform generating a key, the issuing party encrypting data with the key using a symmetric encryption algorithm to create encrypted data, the issuing party encrypting the key using an asymmetric encryption algorithm to create an access key, the issuing party transferring the encrypted data to a data host platform, the data host platform creating a pointer to indicate the location of the encrypted data on the data host platform and the data host platform transferring the pointer to a distributed ledger, the issuing party transferring the access key to the distributed ledger, the issuing party transmitting a request to the distributed ledger to create an authorization token, the distributed ledger creating the authorization token including a unique token identifier, the access key, and the pointer, the distributed ledger transferring the authorization token to a receiving party, the receiving party transmitting a request to the data host platform to access the encrypted data, the data host platform encrypting the encrypted data with the asymmetric encryption algorithm to create twice-encrypted data upon receiving the request to access the encrypted data, the data host platform transferring the twice-encrypted data to the receiving party, the receiving party decrypting the twice-encrypted data using the asymmetric encryption algorithm to produce the encrypted data, the receiving party decrypting the access key using the asymmetric encryption algorithm to produce the key, the receiving party decrypting the encrypted data with the key using the symmetric encryption algorithm to access the data, the receiving party generating a delegate key, wherein the receiving party encrypts the data using the delegate key to create encrypted delegate data, the receiving party encrypting the delegate key using a delegate asymmetric encryption algorithm to create a delegate access key, the receiving party transferring the encrypted delegate data to the data host platform, the data host platform creating a delegate pointer to indicate the location of the encrypted delegate data on the data host platform, the data host platform transferring the delegate pointer to the distributed ledger, the receiving party transferring the delegate access key to the distributed ledger, the receiving party transmitting a request to the distributed ledger to create a delegate authorization token, the distributed ledger creating the delegate authorization token including a unique delegate token identifier, the delegate access key, and the delegate pointer, the distributed ledger transferring the delegate authorization token to a delegate party, the delegate party transmitting a request to the data host platform to access the encrypted delegate data, the data host platform, upon receiving the request to access the encrypted delegate data, encrypting the encrypted delegate data with the delegate asymmetric encryption algorithm to create twice-encrypted delegate data, the data host platform transferring the twice-encrypted delegate data to the delegate party, the delegate party decrypting the twice-encrypted data using the delegate asymmetric encryption algorithm to produce the encrypted delegate data, the delegate party decrypting the delegate access key using the delegate asymmetric encryption algorithm to produce the delegate key, and the delegate party decrypting the encrypted delegate data with the delegate key to access the data.

In still another embodiment, the present invention includes a method for secured, multi-lateral, assured data transfer over a computer network for the exchange of data $D_1$ related to qualifying transactions, the method being accomplished by a distributed computing system including a distributed ledger platform and a data host platform, the method comprising: transferring, from a sending party to a receiving party, access rights to $D_1$, the transferring including: the sending party generating an encryption key, $K_1$, encrypting $D_1$ with $K_1$ using a symmetric encryption algorithm to create encrypted data $D_1^*$; the sending party transmitting $D_1^*$ to the data host platform, wherein the data host platform cannot access $D_1$; the sending party receiving a pointer to $D_1^*$, an uniform resource identifier $D_1^*ID$ that corresponds to $D_1^*$; the sending party encrypting $K_1$ with a public key of the receiving party using an asymmetric encryption algorithm to create an encrypted key $K_1^*$; the sending party signing an Issue transaction via a WalletRegistry smart contract on a distributed ledger platform to create an AuthToken, that is a transferrable non-fungible token on a distributed ledger that expresses a data structure containing $D_1^*ID$, $K_1^*$, and other data such as access policy; and transferring the AuthToken to a cryptographic wallet associated with the receiving party; and accessing $D_1$ by the receiving party, the accessing including: the receiving party signing an access transaction via the WalletRegistry smart contract on the distributed ledger platform resulting in the creation of a session ID, $S_1$; the receiving party sending an access request for $D_1^*$ to the data host platform including $S_1$ and $D_1^*ID$; the data host platform validating the request platform by calling the WalletRegistry smart contract on the distributed ledger platform which consults data authorization policy for validation; in response to the validating, the data host, encrypting $D_1^*$ with the public key of the recipient using asymmetric encryption, resulting in $D_1^{}$, and sending $D_1^{}$ to the receiving party; and the receiving party decrypting $D_1^{**}$ using the receiving party's private key using asymmetric encryption resulting in $D_1^*$, decrypting the encryption key $K_1^*$ with the receiving party's private key using asymmetric encryption resulting in $K_1$, and decrypting the escrowed data $D_1^*$ with the encryption key $K_1$ using symmetric encryption resulting in $D_1$ to thereby gain access to the data $D_1$.

In one embodiment, the present invention includes a method for generating or validating a session ID $S_1$ in the Wallet Registry smart contract that includes retrieving, interpreting, and enforcing an access policy, if assigned the to AuthToken, to determine whether to initiate the access session, where the policy may include rules regarding the qualifying attributes of a transaction, sending party, receiving party, or other context.

None of the prior art discloses a data host platform receiving encrypted data and an encrypted data and further encrypting the data upon receipt of a request to access the data. Secondary encryption provides an additional layer of protection against attacks on the encrypted data, such that in transferring the data from the data host to the recipient, the data is not vulnerable to unauthorized access (i.e., data hacks, man-in-the-middle attacks). Additionally, none of the prior art discloses the use of authorization tokens (AuthTokens) to transfer an encrypted access key to a recipient, wherein the recipient must decrypt the access key to decrypt the encrypted data received from the data host. Further still, none of the prior art disclose the ability of a recipient of granted rights to extend the granted rights to a third party delegate. This allows for trust of unverified entities on a trustless network, as the delegation of rights allows third parties to access the data based on trust between the delegate and the issuing recipient (i.e., the party delegating additional rights).

Self-Sovereign Data Storage (SSDS) systems include techniques to ensure that a issuer maintains control over the distribution of data and the data storage is unable to access the data in an unencrypted form, despite being a location for storage of the data. Self-Sovereign Data Storage has applications in personal identification, access and distribution of medical records, and more general content distribution applications (i.e., consumer market data). However, conventional SSDS requires centralized, trusted parties for distribution of data. These systems do not permit peer-to-peer distribution of rights, transfer of rights between parties, or delegation of rights to additional parties. As a result, data owners have no mechanism for controlling and managing data dissemination without relying on centralized systems for permission management.

A Self-Sovereign Identity (SSI) is a user-centric identity, intended to enable a person to be in full control of their own identity and related data in a decentralized identity environment (e.g., on a distributed ledger). This self-sovereign identity and related data is stored in a digital wallet. Participant nodes of the decentralized network issue, receive, and validate data relating to the self-sovereign identity, transmitted as verifiable credentials that contain individual claims (i.e., individual pieces of information relating to the identity of the user). This verification is accomplished using Distributed Ledger Technology (DLT), which incorporates strong cryptography for building a global blockchain-like consensus network that provides trust for all participants. However, the simple implementation of SSI on DLT for identity verification does not support the transfer of generalized forms of data. Additionally, the DLT does not enforce policies for access rules that are dependent on time or other environmental factors, and further does not include flexible models for the transfer, controlled distribution, and revocation of data rights.

By developing a secure, decentralized method to transfer data access rights via decentralized systems, such as blockchain-based systems, the present invention introduces systems and methods of managing rights to access decentralized data, referred to herein as decentralized data rights management (DDRM). The use of DDRM with SSDS advantageously enables peer-to-peer distribution of rights, transfer of rights between parties, and delegation of rights to additional parties, wherein the rights allow access to data stored on a decentralized ledger. As a result, the present invention provides data owners with a mechanism to control and manage data dissemination without a dependency on centralized systems for permission management.

In one embodiment, DDRM includes digital tokens, such as blockchain based ERC-721 compliant tokens, which are used as authorization tokens (referred to herein as AuthTokens). The AuthToken enables the transfer of authorization via standardized cryptographic wallets which represent addresses on a decentralized computing network. Thus, as the AuthToken is transferred between cryptographic wallets, the wallet which owns the AuthToken is granted the right to access the data. In addition to access rights, AuthTokens represent a broader range of data rights (e.g., update and/or delete rights). In one embodiment, AuthToken actions and transfers are governed by Decentralized Policy Enforcement techniques such as those described in U.S. patent application Ser. No. 16/143,058, incorporated herein by reference in its entirety.

There are three technical issues inherent to the use of decentralized management systems for self-sovereign data. Firstly, there is the issue of the self-sovereignty of data, which requires the data owner to manage the rights for accessing their own data, including setting access policies and auditing data rights. The technical challenge associated with this issue is the transfer of a secure key. Secondly, there is the issue of policy-based peer-to-peer sharing, which requires a secure, intuitive model for peer-to-peer sharing of rights. The technical challenge associated with this issue is leveraging the blockchain for decentralization without storing the key on the chain. Thirdly, there is the issue of providing scalable hosting of data without providing the data host access to the underlying data. The technical challenge associated with this issue is leveraging established cloud-hosting patterns without providing the host access to data.

The technical solution to these issues and challenges includes a) at least two layers of encryption designed to ensure that only authorized recipients are able to access the data in an unencrypted form; b) the use of tokens (e.g., ERC-721 tokens) for transferring rights to access, transfer, and audit the data; and c) a novel hybrid blockchain/cloud storage architecture. By developing a secure, decentralized method to transfer access rights and other rights via blockchain based systems, the present invention enables peer-to-peer distribution of rights, transfer of rights between parties, and delegation of rights to additional parties that are not available using traditional data rights management models and conventional self-sovereign data models. As a result, the present invention provides data owners with a mechanism for controlling and managing data dissemination without a dependency on centralized systems for permission management.

The present invention uses multiple layers of encryption to protect data from unauthorized access. The first layer protects the document from access from the data host or any other unauthorized party, thus creating self-sovereign data. The second layer enables access transfer to authorized recipients within a session established on the decentralized network (i.e., "on-chain"). The present invention includes an "on-chain" token registry and an "off-chain" data host, in addition to other distributed components, as described in detail herein.

The term "owner" as used herein refers to the point of origin of the data and the associated device which is used to carry out the functions of the present invention. In a self-sovereign system such as that of the present invention, the owner of the data is operable to designate access, policies, and destinations for transferring the AuthToken and related data. In one embodiment, the present invention includes an administrator. The term "administrator" as used herein refers to a third party and one or more associated devices which are used to carry out the functions of the present invention. In one embodiment, the administrator functions as a secondary verification of access, policies, and destinations for transferring the AuthToken and related data. For example, in one embodiment, the administrator submits a request to view granted authorizations and receives a list of the granted authorizations. In one embodiment, the administrator is able to revoke the rights of a recipient to view data that the owner allowed them to access. In one embodiment, the administrator is appointed by the data owner. This is accomplished, in one embodiment, by the issuance of an AuthToken to the administrator. In one embodiment, the administrator is automatically designated upon the creation of data using the distributed ledger of the present invention.

Referring now to the drawings in general, the illustrations are for the purpose of describing one or more preferred embodiments of the invention and are not intended to limit the invention thereto.

FIG. 1 is a block diagram of an encryption architecture according to one embodiment of the present invention. Encryption layer 1 uses a symmetric encryption key ("K") to encrypt data, (e.g. File 1, File 2, and subsequent files through File N). The encryption key K is then transferred to a designated recipient over the decentralized network using an intermediary data host platform. The key K and the encrypted data are received at the data host platform. Encryption layer 2 is applied by the data host. The data host asymmetrically encrypts the inner envelope (i.e., the encrypted data and the encryption key K) using a public key ("PK") of the requesting wallet. In one embodiment, this secondary encryption occurs in response to a valid access request from a recipient and/or an administrator. The use of the public key PK of the requesting wallet to encrypt the data requires the use of the private key associated with the wallet to decrypt Encryption layer 2 and thereby access Encryption layer 1 (i.e., the encrypted data and key K). This advantageously prevents a "man-in-the-middle" attack (i.e., an attempt by an unauthorized party to access the data during transfer of the encrypted data from the data host to the requesting wallet) by ensuring only the designated wallet is able to decrypt the key K using the private key.

Encryption layer 1 advantageously enables scalable remote storage and access to data while ensuring the data host never has access to the data in unencrypted form. The secure, decentralized transfer of key K used to encrypt and subsequently decrypt the data is achieved through a novel combination of components and a novel data model of the present invention. Specifically, the transfer of key K uses an AccessToken containing an AccessKey to facilitate rights transfer without compromising the decryption key K. This advantageously allows for the secure transmission of rights over public blockchains.

In one embodiment, Encryption layer 1 is encrypted based on a known symmetric encryption algorithm on the client side. In one embodiment, Encryption layer 1 is based on a known asymmetric encryption algorithm on the client side. In one embodiment, Encryption layer 1 is encrypted using a symmetric encryption algorithm. In one embodiment, Encryption layer 1 is encrypted using an asymmetric encryption algorithm. In one embodiment, Encryption layer 2 is encrypted using a symmetric encryption algorithm. In one embodiment, Encryption layer 2 is encrypted using an asymmetric encryption algorithm.

Figure 2:
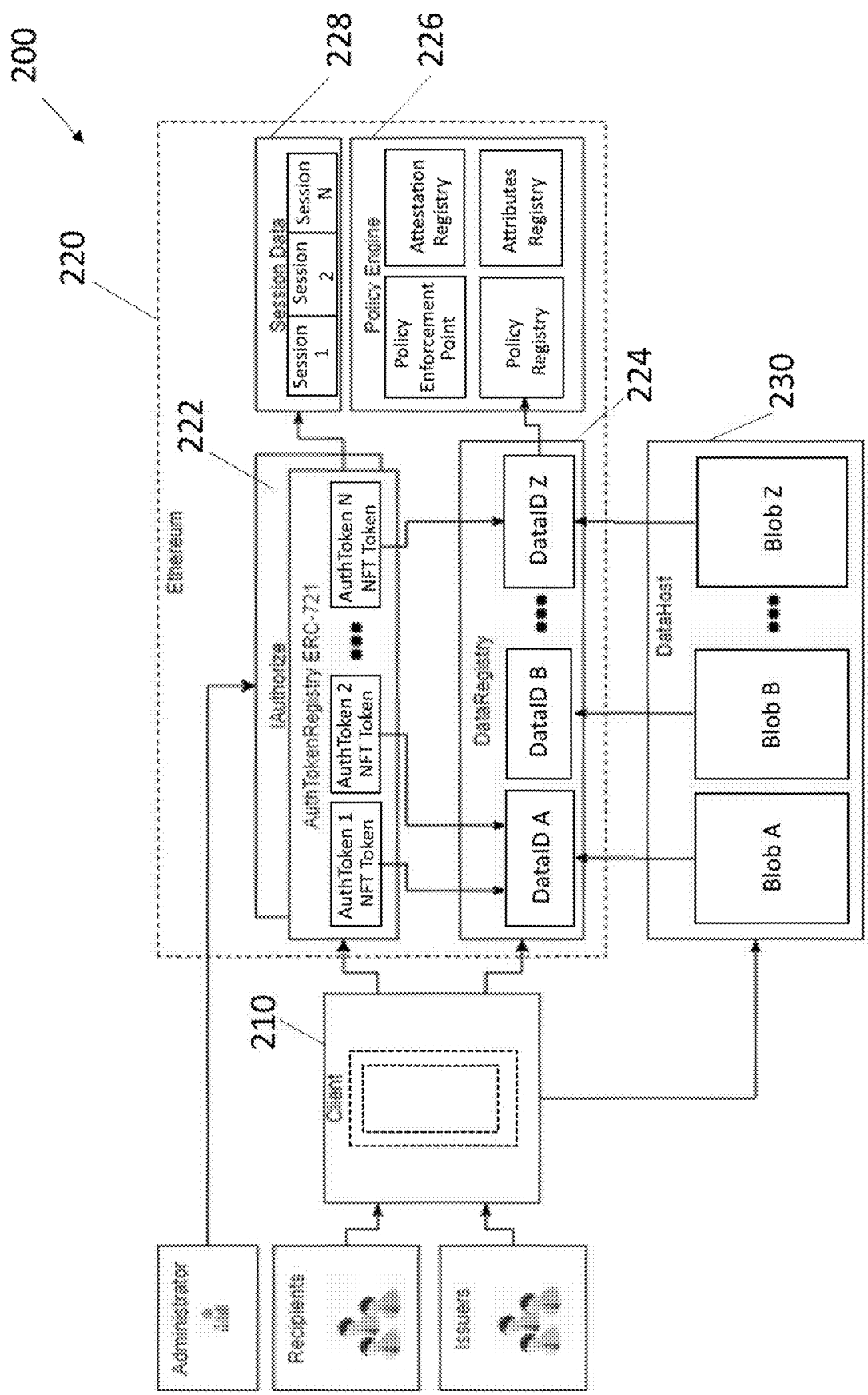
FIG. 2 is a schematic diagram of a decentralized data rights management architecture according to one embodiment of the present invention.

FIG. 2 illustrates a hybrid distributed networked computing system 200 according to one embodiment of the present invention. The system 200 addresses the technical issues of requiring a data owner to manage the rights for accessing their own self-sovereign data, the ability to share rights in a peer-to-peer transfer, and providing scalable hosting of data without providing the data host access to the underlying data. These are addressed through a distributed computing system including the client interface 210 of a computing platform (also referred to herein as "client 210"), the off-chain data host platform 230, and the on-chain distributed ledger platform 220. The client 210, data host platform 230, and distributed ledger platform 220 enable the registration of wallets and secure, assured transfer of rights to client data when a qualifying transaction occurs. The distributed ledger platform 220 includes the authorization token registry 222 and one or more data registration smart contracts 224 for generating an AuthToken. The distributed ledger platform 220 further includes a policy engine 226 and a session registry 228.

The distributed ledger platform 220 is a decentralized infrastructure allowing immutable recordation of transactions. In one embodiment, the distributed ledger platform 220 is a blockchain, including but not limited to the Ethereum blockchain, the Ripple blockchain, the Stellar blockchain, and the Bitcoin blockchain. In one embodiment, the distributed ledger platform 220 is another distributed ledger technology that is not a blockchain.

In one embodiment, the data host platform 230 is implemented as off-chain data storage for storing encrypted data which cannot be decrypted by the data host platform 230. In one embodiment, the encrypted data is hosted using on-premises storage. In one embodiment, the encrypted data is hosted using cloud storage. In one embodiment, the encrypted data is hosted using decentralized storage systems (e.g., the InterPlanetary File System (IPFS) decentralized data storage). The data host and location of stored encrypted data specifically disclosed herein should not be considered limiting as to the location or type of data storage. One of ordinary skill in the art will appreciate that there are a variety of data storage techniques operable to provide the function of the data host as described herein and are therefore considered to be within the scope of the invention.

The distributed ledger platform 220 includes authorization token registry 222 ("AuthTokenRegistry") and data registration smart contract(s) 224 ("DataRegistry"). The present invention uses, in one embodiment, an extended ERC-721 token for the on-chain representation of the authorization tokens ("AuthToken"). As noted above, the data host platform 230 is used for storage of encrypted data. In one embodiment, the InterPlanetary File System (IPFS) is used for cloud storage of encrypted documents. The IPFS is a decentralized storage solution for blockchain-based content. When using the IPFS, files are divided into parts and stored across a network of nodes that track the file by hashes. The parts are then assembled together, based on their hash value, to recreate the original file. In the examples herein, clusters of data are referred to as "files". However, the term "files" as used herein refers to one or more packets or clusters and need not be understood as a single file in the conventional sense of the word.

The data host platform 230 has no access to the unencrypted data. The policy engine 226 of distributed ledger platform 220 ensures regulatory compliance for any transactions and includes a policy enforcement point (PEP), a policy registry, and attestation registry and an attributes registry. In one embodiment, the policy engine includes descriptions of the location and process for obtaining the data needed to determine compliance in accordance with a relevant policy. In one embodiment, the location and process for obtaining the data needed to determine policy compliance is saved as a ruleset in the policy engine 226. Upon receiving a prompt from the distributed ledger to verify the policy compliance, the policy engine 226 accesses the ruleset and executes one or more smart contracts to determine compliance. For example, if a policy limits the number of AuthToken holders, an attribute in the policy engine contains a map with instructions on how to obtain the current number of AuthToken holders to evaluate compliance with the policy. In one embodiment, the policy engine 226 is that of the policy engine described in U.S. patent application Ser. No. 16/143,058, incorporated herein by reference in its entirety.

The session registry 228 of the distributed ledger platform 220 includes session data relating to the individual sessions wherein the data has been accessed. Each session is identified by a SessionID generated by the distributed ledger upon access to the data. The SessionID contains AuthTokenID for the corresponding AuthToken, time-to-live (TTL) or other expiration data, and data rights (i.e., the right to access, update, delete, etc.). In one embodiment, upon expiration of the time-to-live, the session is no longer able to retrieve the data from the data host platform.

Client 210 and data host platform 230 are implemented using a range of hardware, software programming and architecture techniques. The present invention is configured to operate using C++, Java, node.js, Flutter, React, and/or any other modern programming language for the client interface and data host. In one embodiment, the client interface uses symmetric and asymmetric encryption, while the data host uses asymmetric encryption. In one embodiment, both the client interface and the data host use symmetric and asymmetric encryption.

Decentralized data rights management includes seven main processes. First, the data owner creates and delivers a token providing access to protected content. The authorized recipient then accesses protected content. The owner provides additional access to protected content by providing access to additional recipients. The one or more recipients are able to delegate rights (with ability to revoke the rights) to another user while retaining their own access rights. However, the owner (or administrator, if implemented) is able to remove rights from one or more recipients. As authorization is granted and access is allowed, the data owner (or administrator, if implemented) reviews all rights, transfers, and authorizations relating to the data. A policy engine is used to enforce complex authorization or transfer policies relating to the data.

In one embodiment, the AuthToken interface specification is implemented as code stored on the distributed ledger. An example of such code is set forth below in the Solidity smart contract language.

```
pragma solidity >=0.5.0 <0.6.0;
pragma experimental ABIEncoderV2;
/**
@title Interface of the Authorization Token
*/
interface IAuthToken {
/**
@dev Creates access token
@param dataId Data or document identifier
@param accessKey Encrypted key
@param to A token recipient
*/
function createAuthToken(uint dataId, string calldata accessKey, address to)
external;
/**
@dev Prepares information about account
@param account Account address
*/
function getFilesForAccount(address account)
external
view
returns (
uint[50] memory accessTokensIds,
uint[50] memory dataIds,
bool[50] memory isOwner
);
/**
@dev Creates auth session, returns accessKey and sessionId
@param authTokenId Access token identifier
*/
function createSession(uint authTokenId) external returns (string memory);
/**
@dev Returns list of the users that have access to the data
@param authTokenId Auth token identifier
*/
function getPermissionsById(uint authTokenId) external view returns
(address [] memory);
/**
@dev Save permissions for the data specified in the token
@param authTokenId AuthToken identifier
```

```
@param accessKeys List of the access keys for the data
@param recipients List of the recipients of the permissions
*/
function savePermissions(uint authTokenId, string[] calldata accessKeys,
address[] calldata recipients) external;
/**
@dev Get access key by auth token id
@param authTokenId Access token identifier
*/
function getAccessKeyById(uint authTokenId) external view returns (string
memory);
/**
@dev Reads session details
@param sessionId Session identifier
*/
function getSessionDetails(uint sessionId) external view returns (address
recipient uint dataId, uint ttl);
}
```

Figure 3:
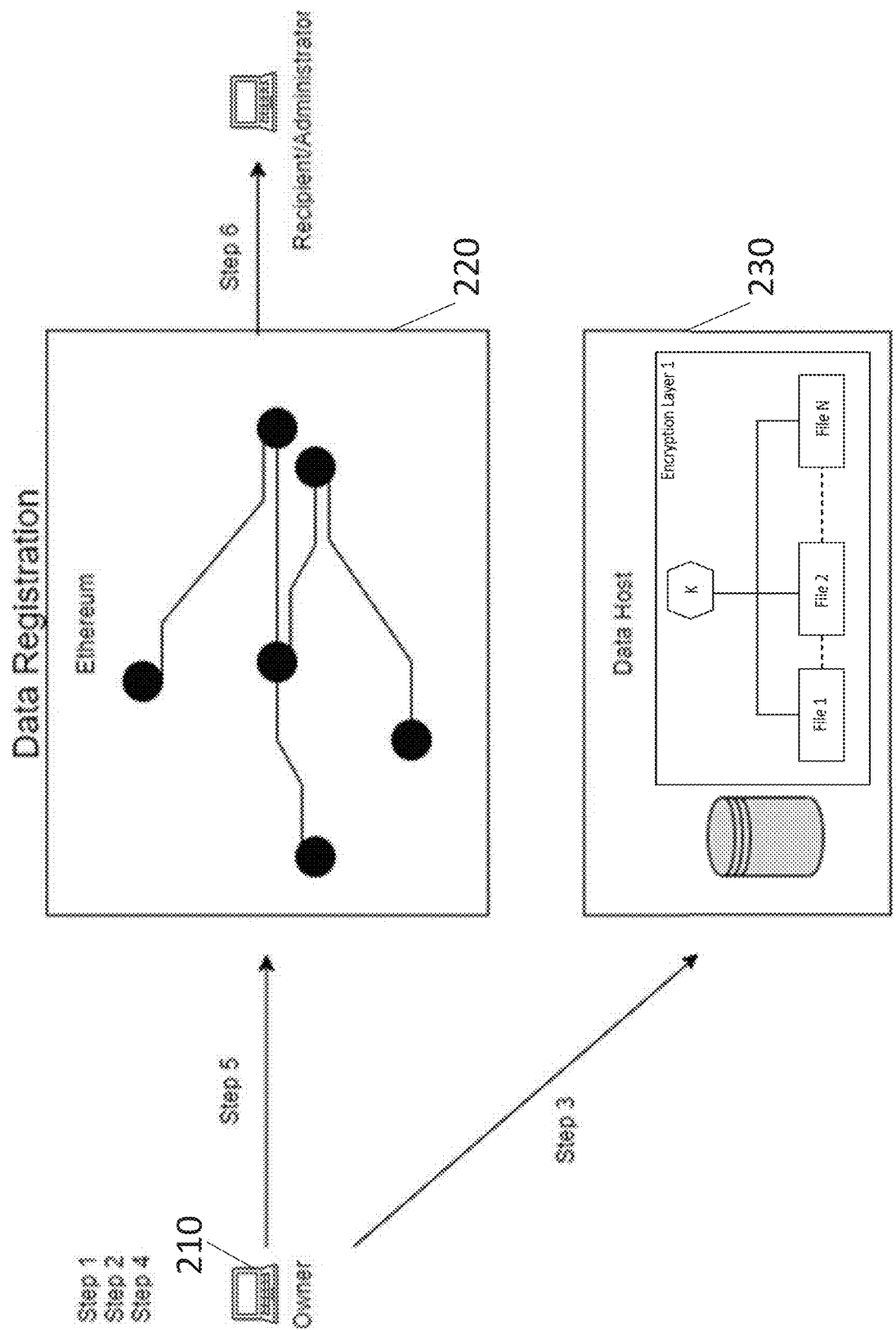
FIG. 3 is a schematic illustration of a data registration workflow according to one embodiment of the present invention.

FIG. 3 is a schematic illustration of a data registration process according to one embodiment of the present invention. In one embodiment, the data registration process is accomplished by the computing system shown in FIG. 2. A data owner registers data for distribution. To share the data, the owner creates an access key, K, for encryption using known key generation techniques, at step 1. The owner retains K. At step 2, the owner then encrypts the data, including personally identifiable (PII), using key K and a symmetric encryption algorithm. At step 3, the owner then sends the encrypted data, using client 210, to data host platform 230 and data host platform 230 generates an internal ID "DataID" that is used to identify and retrieve the encrypted data in the system. One of ordinary skill in the art will appreciate that the DataID functions as a pointer to indicate the specific data that an AuthToken allows a recipient to access on the data host platform 230. In one embodiment, the data host sends the DataID to the distributed ledger platform upon generation of the DataID. In one embodiment, the data host sends the DataID to the owner upon generation of the DataID.

At step 4, the owner encrypts key K using the public key of the recipient's wallet, which utilizes an asymmetric encryption algorithm resulting in the creation of an access key "AccessKey" for the recipient. As a result, only the desired recipient holds the private key for the public address (i.e., the private key associated with the wallet). The private key is the only method to decrypt data that has been encrypted by the public key, such as the AccessKey. Decryption of the AccessKey is a required step to access the shared data that has been encrypted using the encryption key K. This is a particularly advantageous step, as the sender is not required to have the recipient's private key in order to encrypt the contents. Only the public key is required, thereby ensuring the security of data encrypted using the encryption key K that is then encrypted using the public key. At step 5, the owner signs a register request (e.g., createAuthToken) and transmits the request to the blockchain authorization token registry 222. Upon receiving the signed request, the authorization token registry issues one or more AuthTokens for each desired recipient, by means of a smart contract of the distributed ledger platform 220. At step 6, the issued AuthToken is sent to one or more wallets corresponding to one or more recipients.

In one embodiment, the present invention uses an Ethereum token for the on-chain representation of the authorization tokens, including but not limited to an ERC-20 token, an ERC-777 token, an ERC-721 token, an ERC-1155 token, an ERC-223 token, an ERC-827 token, an ERC-1337, and an ERC-4626 token. In one embodiment, the present invention utilizes transfer functions associated with an ERC-20 token, an ERC-777 token, an ERC-721 token, an ERC-1155 token, an ERC-223 token, an ERC-827 token, an ERC-1337, and an ERC-4626 token. In one embodiment, the AuthToken is transferred to the wallet of the recipient using transfer functions equivalent to the ERC transfer functions disclosed herein.

In one embodiment, a separate party (e.g., a data verification entity) is used to verify the authenticity of the data. For example, an owner posts data related to their self-sovereign identity (SSI). This data is able to be registered and shared but is not verified to be accurate by an authorized third party. When a third party is provided access, they certify the data. Details regarding the third-party verification of data are disclosed in U.S. patent application Ser. No. 17/211,432, incorporated herein by reference in its entirety.

In one embodiment, the AuthToken is a non-fungible token (NFT) expressed as a data structure that contains an AuthTokenID (i.e., a unique token identifier), the AccessKey (i.e., key K that has been encrypted), the DataID used to identify and retrieve the encrypted data, a PolicyID for identifying one or more policies to be applied/enforced by policy engine 226, and a source (i.e., the owner of the data). In one embodiment, the AuthToken further includes a data verification entity.

Figure 4:
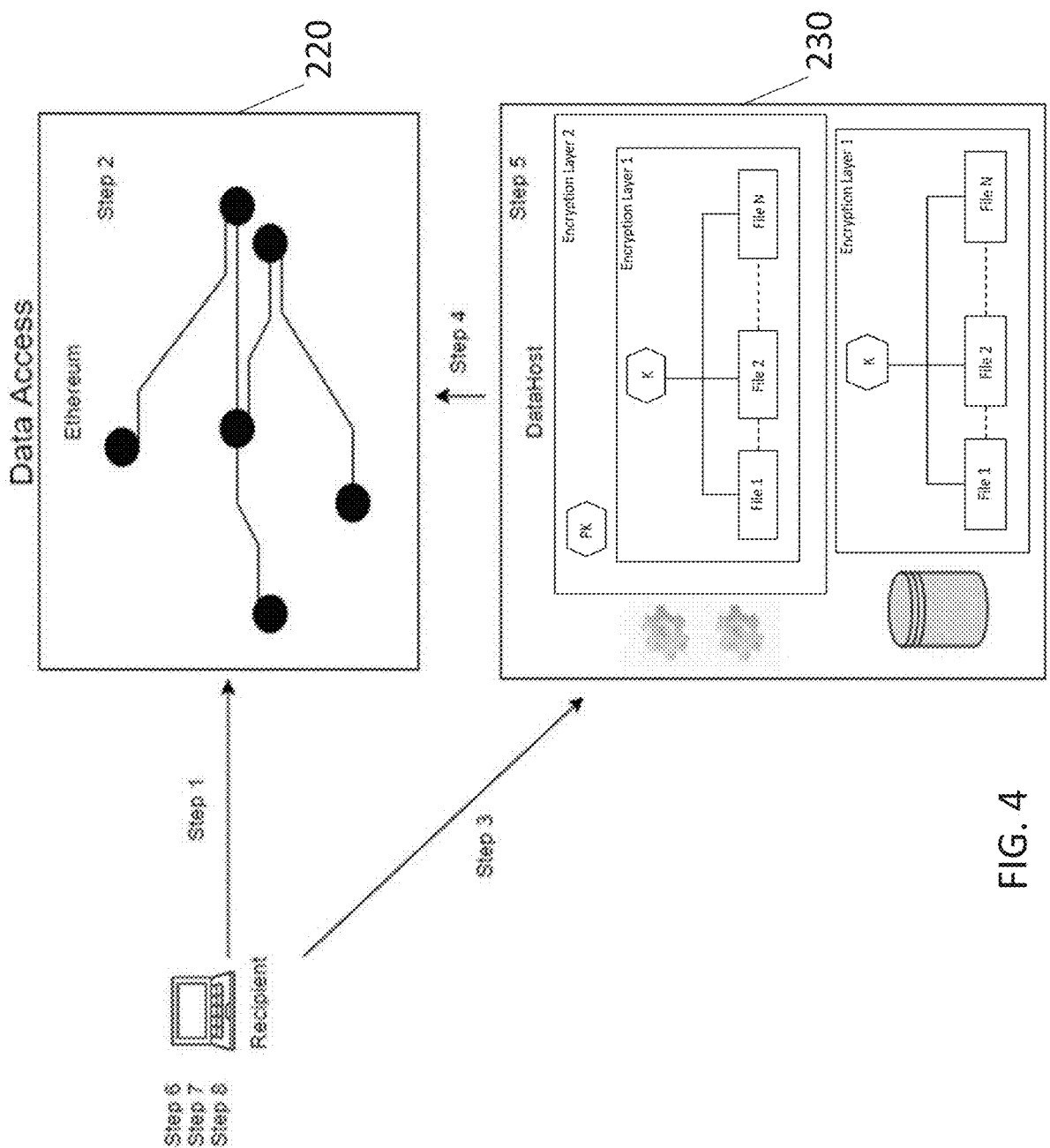
FIG. 4 is a schematic illustration of a data access workflow according to one embodiment of the present invention.

FIG. 4 is a schematic illustration of a data access process according to one embodiment of the present invention. Using this process, the recipient gains access to encrypted data based on the rights granted above. At step 1, the recipient signs an access request message (e.g., createSession) including AuthTokenID. The request is sent to the distributed ledger platform 220 to open an authorization session for the requested data. At step 2, a smart contract on the distributed ledger platform 220 checks whether the recipient is an AuthToken holder for the requested data (e.g., by verifying that the recipient has been granted access rights consistent with the authorization request and has supported a qualifying transaction for the client wallet). In one embodiment, a smart contract on the distributed ledger platform 220 checks with the policy engine to verify policy compliance. If the recipient is an AuthToken holder for the requested data, a return of yes is sent to the distributed ledger and a SessionID is generated. The SessionID is stored on-chain in session registry 228 (see FIG. 2). In one embodiment, the SessionID contains AuthTokenID for the corresponding AuthToken, time-to-live (TTL) or other expiration data associated with the data and/or the AuthToken, and data rights (i.e., the right to access, update, delete, etc.). At step 3, the recipient sends a request message containing the SessionID to data host platform 230. In one embodiment, expiration of the time-to-live results in the denial of the request sent to the distributed ledger platform 220 to open an authorization session for the requested data.

At step 4, the data host platform 230 sends a request message (e.g., getSessionDetails) to distributed ledger platform 220 to obtain DataID, TTL data, and the public key PK of an account associated with the authorization request. In one embodiment, this request message contains the SessionID. In one embodiment, during this step, a smart contract of the distributed ledger (e.g., WalletRegistry smart contract) consults the policy engine to determine if a qualifying event has occurred or other conditions have been met prior to sending a response containing the encrypted data. At step 5, the data host platform 230 retrieves the corresponding encrypted files using the DataID and encrypts the files again using asymmetric encryption and the public key PK of the wallet requesting access. This creates encryption layer 2, as disclosed herein. At step 6, the recipient decrypts the data using its wallet's private key resulting in data packet with encryption layer 1 noted above (i.e., encrypted data and the AccessKey). At step 7, the recipient decrypts AuthTokenID using its private key yielding encryption key K. At step 8, the recipient decrypts the encrypted data using key K to thereby gain access to the data. In one embodiment, in a multilateral exchange of data, each party implements the process of FIG. 5 to provide data access to the other party or multiple parties.

Figure 5:
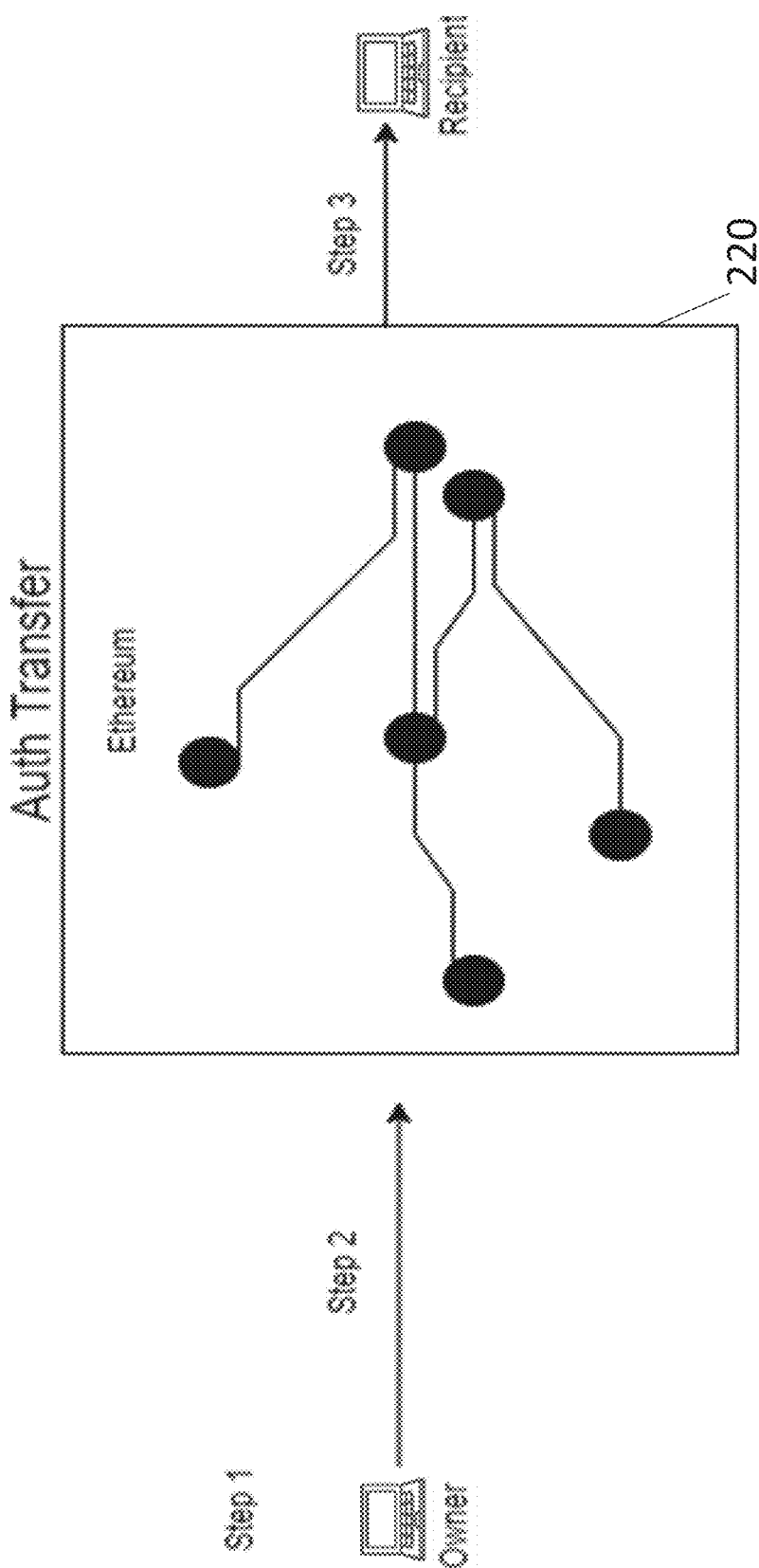
FIG. 5 is a schematic illustration of an additional authorization workflow according to one embodiment of the present invention.

FIG. 5 is a schematic illustration of the steps for an owner, as the originating party, to provide data access rights to a recipient according to one embodiment of the present invention. In one embodiment, in a multilateral exchange of data, each party implements the process of FIG. 4 to provide data access to the other party or multiple parties. At step 1, an owner asymmetrically encrypts key K using the public key of one or more wallets of a recipient to thereby create an AccessKey for each wallet that will receive authorization. At step 2, the owner signs an authorize request (i.e., createAuthToken) and sends the request to the distributed ledger platform 220 resulting in the smart contract issuing one or more AuthTokens for the recipients who will have access to the data. In one embodiment, recipients will only have access to the data upon occurrence of a qualifying transaction. In one embodiment, the AuthToken data structure is that of the AuthToken described herein. In one embodiment, the AuthToken data transfer functions are that of the AuthToken described herein. In one embodiment, the source of the AuthToken data structure indicates the wallet of the original owner. At step 3, AuthTokens are sent to wallets of the recipients. In one embodiment, the original data owner may revoke the authorization of the recipient to access the data.

Figure 6:
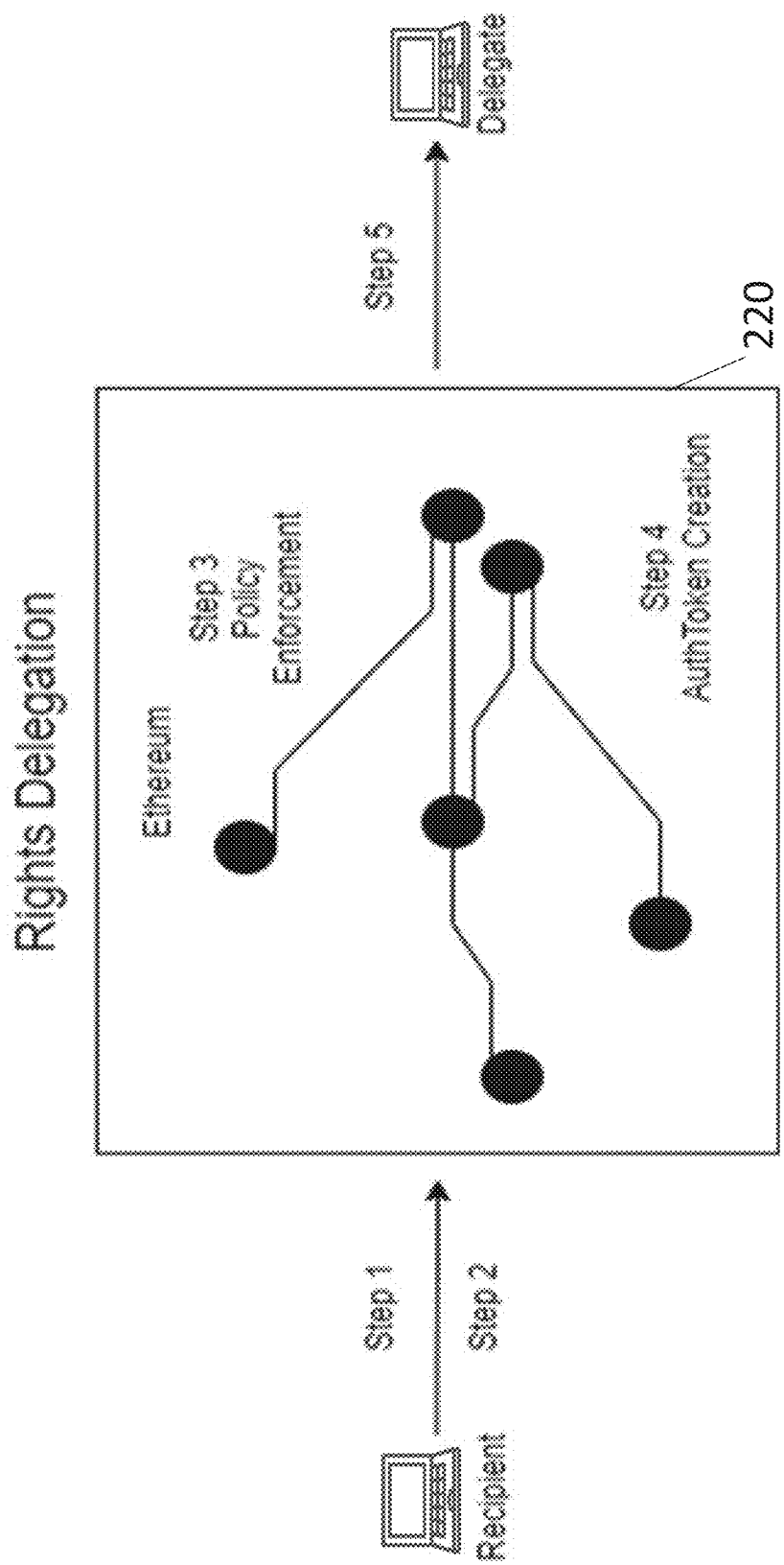
FIG. 6 is a schematic illustration of a rights delegation workflow according to one embodiment of the present invention.

FIG. 6 is a schematic illustration of a rights delegation process according to one embodiment of the present invention. At Step 1, the recipient decrypts the AccessKey, as described herein to obtain key K. At Step 2, the recipient uses the public key PK of the delegate to encrypt key K to obtain a Delegate AccessKey. At Step 3, the recipient signs an authorize request (i.e., createAuthToken) and sends the request to the AuthDataRegistry SmartContract of the distributed ledger platform 220. The SmartContract determines if a transfer is eligible based on the policy implemented by the data. If authorized, the smart contract conducts Step 4 in which a new AuthToken is created with the recipient as source, including the Delegate AccessKey rather than the AccessKey used by the original recipient. At Step 5, the recipient transfers the new AuthToken to the delegate using a transfer function of the token. In one embodiment, the issuing recipient may revoke the authorization of the delegate to access the data. In one embodiment, the original data owner may revoke the authorization of the delegate to access the data. In one embodiment, either the original data owner or the issuing recipient may revoke the authorization of the delegate to access the data. In one embodiment, revocation of the the authorization of the delegate to access the data results in the denial of the request to the AuthDataRegistry SmartContract for accessing the data.

Figure 7:
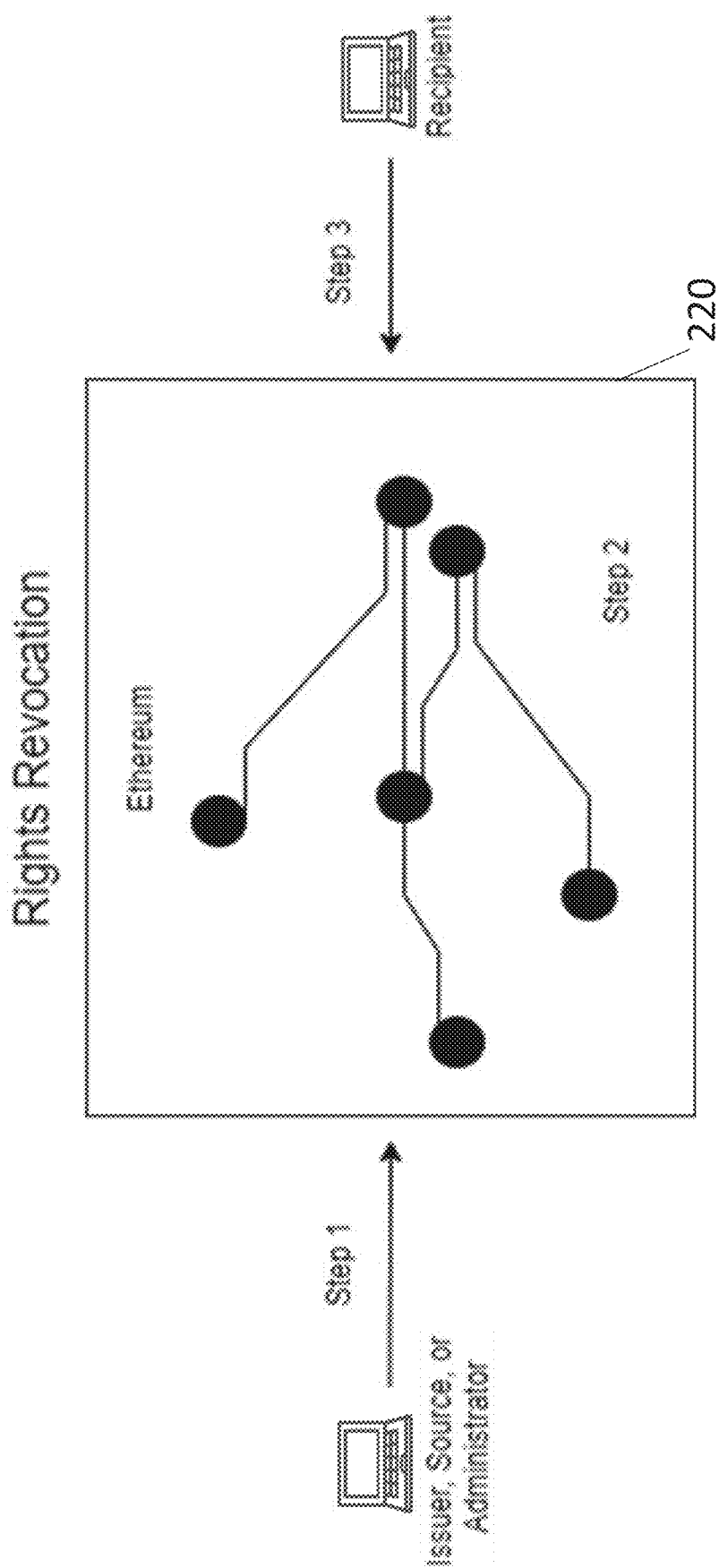
FIG. 7 is a schematic illustration of a rights revocation workflow according to one embodiment of the present invention.

FIG. 7 is a schematic illustration of a rights revocation process. At step 1, the source of the data (i.e., the data owner, an issuing recipient, or an administrator) signs a revoke transaction and transmits the revoke transaction to the AuthDataRegistry SmartContract on the distributed ledger platform 220. At step 2, the SmartContract determines eligibility of the initiator of the transaction. If eligible, the AuthToken and any active sessions are removed. At step 3, the AuthToken is no longer accessible via the recipient's wallet.

In one embodiment, the presence of an administrator clawback is a preference that is selectively enabled and/or disabled. One of ordinary skill in the art will appreciate that the term "clawback" refers to a method for recovering data and/or authorization that has already been distributed to the recipient, including the revocation of access rights granted to that recipient. In one embodiment, enablement of the administrator clawback at the smart contract scope enables an administrator clawback for all tokens. In one embodiment, enablement of the administrator clawback is determined on a per-token basis by the owner. In one embodiment, the clawing back of data requires a penalty fee to be transferred from the recipient and/or designee from which the data and/or authorization is clawed back to the administrator in the event that the data and/or authorization is clawed back. In one embodiment, the clawback is a smart contract executed on the distributed ledger network.

In one embodiment, AuthTokens according to the present invention may be set to expire at a certain time by the owner. Thus, the AuthToken is not removed from the recipient and/or the delegate, but the recipient and/or the delegate will no longer enable access to the data, as the time-to-live included in the SessionID will indicate the data has expired. In one embodiment, the recipient and/or the delegate submits a reauthorize request. If approved, the authorization of the recipient and/or the delegate will be restored. If denied, the authorization of the recipient and/or the delegate will not be restored. In one embodiment, an issuing recipient reauthorizes delegate authorization. In one embodiment, an owner reauthorizes recipient and delegate authorization. In one embodiment, an owner reauthorizes recipient authorization. In one embodiment, either an owner or an administrator reauthorizes recipient and delegate authorization.

Figure 8:
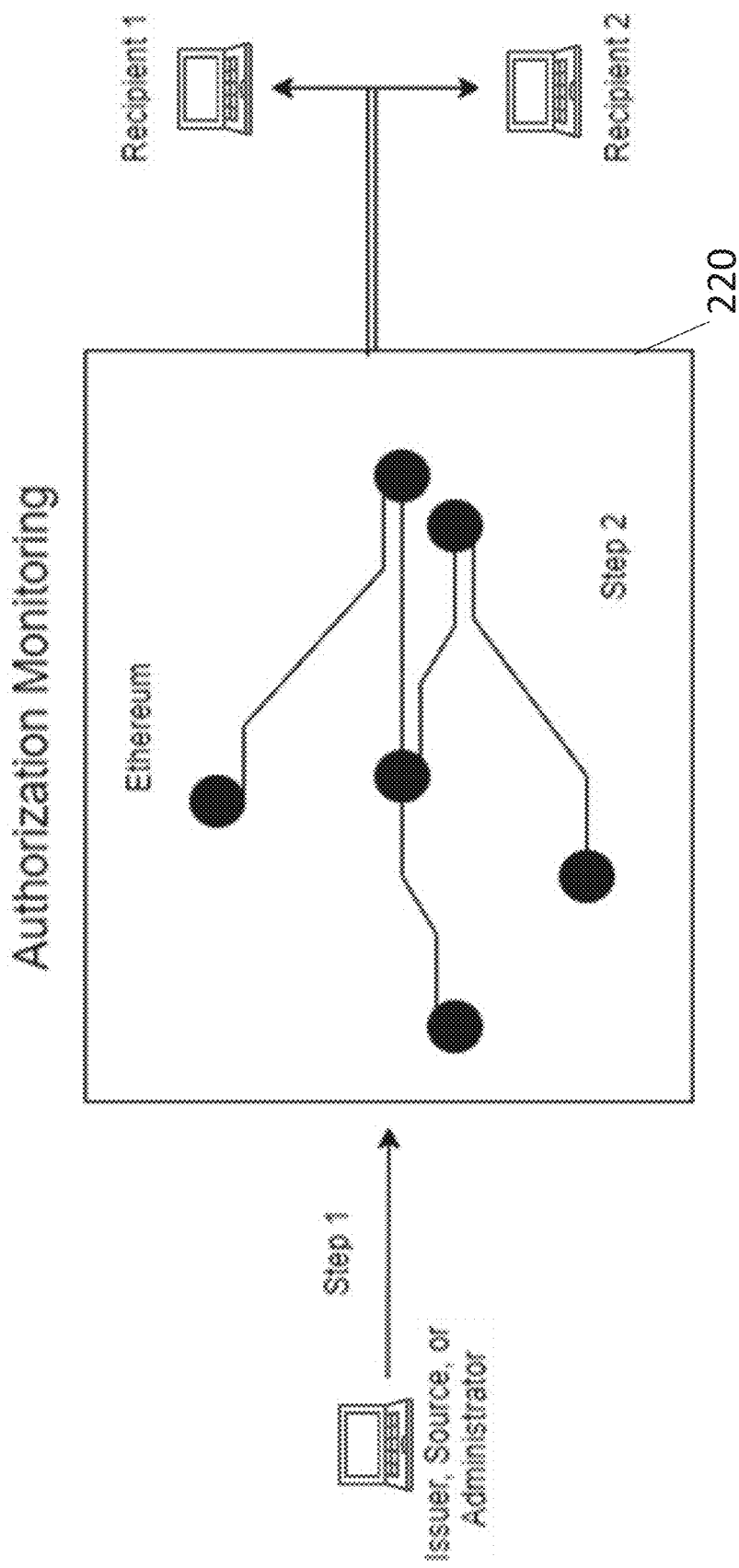
FIG. 8 is a schematic illustration of a rights monitoring workflow according to one embodiment of the present invention.

FIG. 8 is a schematic illustration of a rights monitoring process according to one the present invention. At Step 1, the owner, administrator, or other issuing source sends a request via a smart contract (e.g., getPermissionsById) to the AuthTokenRegistry of the distributed ledger platform 220 to view all granted authorizations At step 2, the smart contract returns the results and the owner, administrator, or other issuing source is able to view the granted authorizations.

Figure 9:
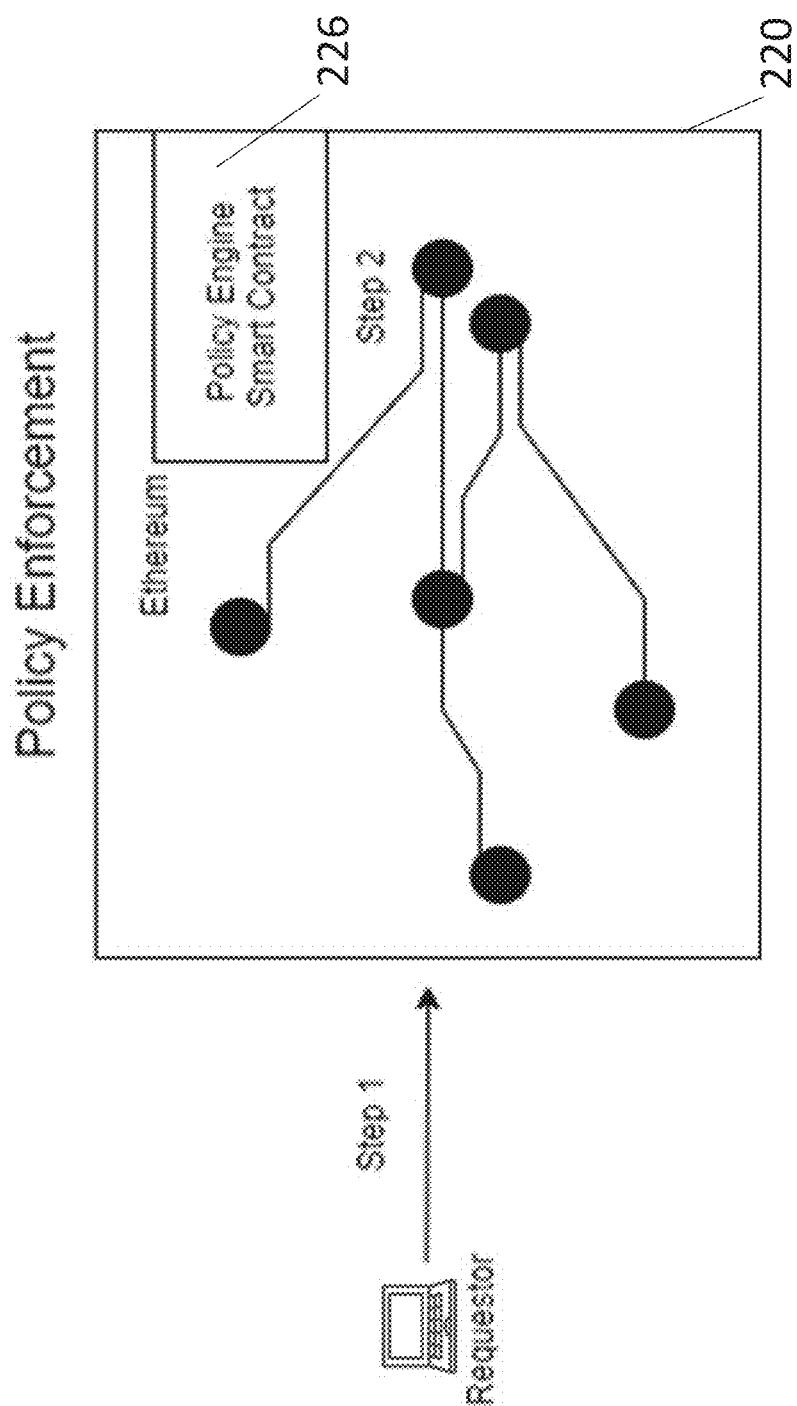
FIG. 9 is a schematic illustration of a policy enforcement workflow according to one embodiment of the present invention.

FIG. 9 is a schematic illustration of a policy enforcement process according to one embodiment of the present invention. At Step 1, the requestor signs a transaction (such as an authorize, access, delegate, revoke, or transfer transaction) and sends the transaction to the AuthDataRegistry Smart Contract of the distributed ledger platform 220. At step 2, AuthDataRegistry Smart Contract consults the policy engine 226 to verify the legitimacy of the request. If the requestor is not authorized to authorize, access, delegate, revoke, or transfer the data, the policy engine denies the request. In one embodiment, the policy engine responds with an error code and/or an error message if the request is denied.

The workflows described herein leverage the use of a data access token in the process of a secure, conditional exchange of information where multiple parties are assured that the data is both properly used and is available upon meeting the conditions. The owner has certainty in advance that access conditions must be met according to configured policies for the recipient to gain access. The novel combination of data structures, on-chain and off-chain registries, key management and secure message flows allow the parties to be assured of secure data exchange. The present invention includes one or more of the rights transfer and data access processes described herein.

The present invention is implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Figure 10:
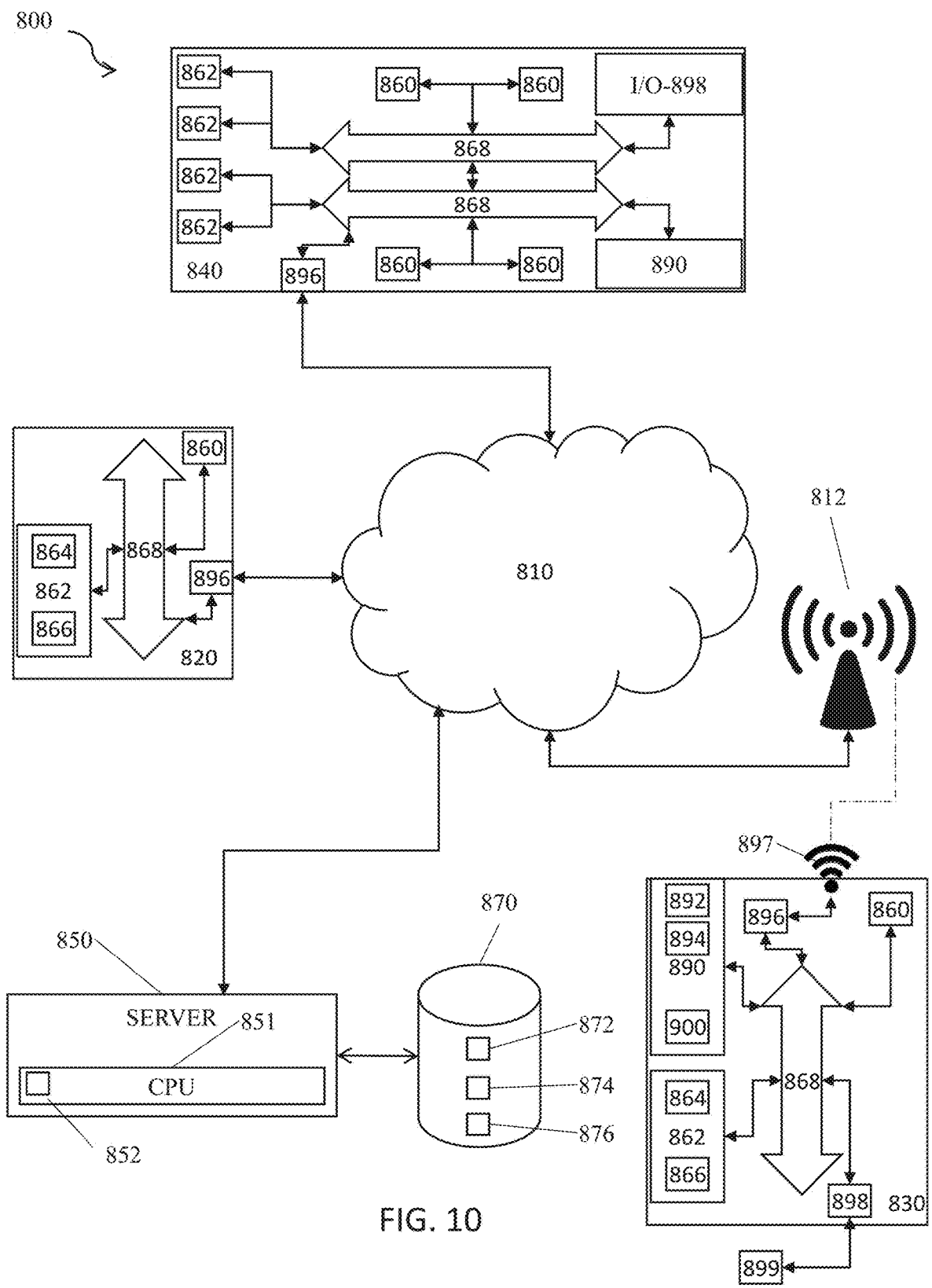
FIG. 10 is a schematic diagram of a system of the present invention.

FIG. 10 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a readonly memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 10, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 10, is operable to include other components that are not explicitly shown in FIG. 10, or is operable to utilize an architecture completely different than that shown in FIG. 10. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in *The Business of Blockchain* by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the *EIP-20: ERC-20 Token Standard*, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, *EIP-721: ERC-721 Non-Fungible Token Standard* by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method of secure data transfer over a distributed ledger, comprising:
  an issuing party of a decentralized computer platform generating a key;
  the issuing party encrypting data with the key using a symmetric encryption algorithm to create encrypted data;
  the issuing party encrypting the key using an asymmetric encryption algorithm to create an access key;
  the issuing party transferring the encrypted data to a data host platform;
  the data host platform creating a pointer to indicate the location of the encrypted data on the data host platform and the data host platform transferring the pointer to a distributed ledger;
  the issuing party transferring the access key to the distributed ledger;
  the issuing party transmitting a request to the distributed ledger to create an authorization token;
  the distributed ledger creating the authorization token including a unique token identifier, the access key, and the pointer;
  the distributed ledger transferring the authorization token to a receiving party;
  the receiving party transmitting a request to the data host platform to access the encrypted data;
  the data host platform encrypting the encrypted data with the asymmetric encryption algorithm to create twice-encrypted data upon receiving the request to access the encrypted data;
  the data host platform transferring the twice-encrypted data to the receiving party, the receiving party decrypting the twice-encrypted data using the asymmetric encryption algorithm to produce the encrypted data;
  the receiving party decrypting the access key using the asymmetric encryption algorithm to produce the key; and
  the receiving party decrypting the encrypted data with the key using the symmetric encryption algorithm to access the data.

2. The method of claim 1, further comprising the issuing party revoking the authorization token from the receiving party, wherein revocation of the authorization token prevents the data host platform from transferring the twice-encrypted data to the receiving party.

3. The method of claim 2, further comprising the receiving party transmitting a request to the issuing party for reissuance of the authorization token.

4. The method of claim 1, further comprising the receiving party viewing the data in a session on the distributed ledger and the issuing party monitoring the activity of the receiving party in the session.

5. The method of claim 1, wherein the authorization token further includes an expiration time, a data verification entity, and policy identification entity for identifying one or more policies enforced on the distributed ledger.

6. The method of claim 1, wherein the distributed ledger includes a policy engine for enforcing one or more policies associated with the secure data transfer process.

7. The method of claim 6, further comprising the data host platform consulting the policy engine to determine if a qualifying event has occurred prior to allowing the receiving party to access the data.

8. The method of claim 1, wherein the encrypted data includes a time-to-live, wherein upon expiration of the time-to-live, the request to access the encrypted data sent by the receiving party is denied.

9. A computer system for secure data transfer over a decentralized computer network, comprising:
  at least one computer processor and at least one memory having instructions stored therein;
  a distributed ledger, a data host platform, an issuing client interface, a receiving client interface, and an administrative client interface;
    wherein the issuing client interface is configured to generate a symmetric encryption key, wherein the symmetric encryption key is used to encrypt the data to create encrypted data;
    wherein the issuing client interface uses the public key of the receiving client interface and an asymmetric encryption algorithm to encrypt the symmetric encryption key to produce an access key, wherein the issuing client interface transfers the access key to the distributed ledger;
    wherein the data host platform is in network communication with the issuing client interface, wherein the data host platform receives encrypted data from the issuing client interface;
    wherein the data host platform is configured to generate a pointer upon receiving data from the issuing client interface, wherein the data host platform transfers the pointer to the distributed ledger;
    wherein the distributed ledger includes an authorization registry, wherein the issuing client interface transfers a request to the authorization registry to issue an authorization token, wherein the authorization token includes the pointer, the access key, and a unique token identifier;
wherein the distributed ledger is configured to transfer the authorization token to the receiving client interface immediately upon issuing the authorization token;
wherein the receiving client interface uses a private key of the receiving client interface and the asymmetric encryption algorithm to decrypt the access key to produce the key;
wherein upon receiving the authorization token from the distributed ledger, the receiving party transmits the token identifier to the distributed ledger with a request to access the encrypted data, wherein the request is granted;
wherein the distributed ledger includes a session registry, wherein, upon the granting of the request, the distributed ledger creates a session in the session registry and a session identifier is sent to the receiving client interface;
wherein the data host platform receives the session identifier and the pointer from the receiving client interface, wherein the data host platform verifies the session identifier with the distributed ledger, wherein upon verification of the session identifier, the data host platform encrypts the encrypted data with the public key of the receiving client interface and the asymmetric encryption algorithm to create twice-encrypted data;
wherein the receiving client interface decrypts the twice-encrypted data using the private key of the receiving client interface and the asymmetric encryption algorithm;
wherein the receiving client interface decrypts the encrypted data using the key to access the data; and
wherein the administrator client interface is configured to monitor the session registry and the authorization registry.

10. The system of claim 9, wherein the issuing client interface and/or the administrator executes a smart contract to revoke the authorization token from the receiving client interface, wherein revocation of the authorization token results in the denial of the request sent by the receiving client interface to the distributed ledger to access the encrypted data.

11. The system of claim 10, wherein the receiving client interface transmits a request to the issuing client interface and/or the administrator client interface for reissuance of the authorization token.

12. The system of claim 9, wherein the receiving party views the data in a session on the distributed ledger, wherein the issuing party monitors the activity of the receiving party in the session.

13. The system of claim 9, wherein the authorization token further includes a policy identification for identifying one or more policies enforced on the distributed ledger and a data verification entity.

14. The system of claim 9, wherein the distributed ledger includes a policy engine for enforcing one or more policies with which the data transfer is compliant.

15. The system of claim 14, wherein the data host platform consults the policy engine to determine if a qualifying event has occurred prior to allowing the receiving party to access the data.

16. A method of secure data transfer over a distributed ledger, comprising:

an issuing party of a decentralized computer platform generating a key;
the issuing party encrypting data with the key using a symmetric encryption algorithm to create encrypted data;
the issuing party encrypting the key using an asymmetric encryption algorithm to create an access key;
the issuing party transferring the encrypted data to a data host platform;
the data host platform creating a pointer to indicate the location of the encrypted data on the data host platform and the data host platform transferring the pointer to a distributed ledger;
the issuing party transferring the access key to the distributed ledger;
the issuing party transmitting a request to the distributed ledger to create an authorization token;
the distributed ledger creating the authorization token including a unique token identifier, the access key, and the pointer;
the distributed ledger transferring the authorization token to a receiving party;
the receiving party transmitting a request to the data host platform to access the encrypted data;
the data host platform encrypting the encrypted data with the asymmetric encryption algorithm to create twice-encrypted data upon receiving the request to access the encrypted data;
the data host platform transferring the twice-encrypted data to the receiving party, the receiving party decrypting the twice-encrypted data using the asymmetric encryption algorithm to produce the encrypted data;
the receiving party decrypting the access key using the asymmetric encryption algorithm to produce the key;
the receiving party decrypting the encrypted data with the key using the symmetric encryption algorithm to access the data;
the receiving party generating a delegate key, wherein the receiving party encrypts the data using the delegate key to create encrypted delegate data;
the receiving party encrypting the delegate key using a delegate asymmetric encryption algorithm to create a delegate access key;
the receiving party transferring the encrypted delegate data to the data host platform;
the data host platform creating a delegate pointer to indicate the location of the encrypted delegate data on the data host platform, the data host platform transferring the delegate pointer to the distributed ledger;
the receiving party transferring the delegate access key to the distributed ledger;
the receiving party transmitting a request to the distributed ledger to create a delegate authorization token;
the distributed ledger creating the delegate authorization token including a unique delegate token identifier, the delegate access key, and the delegate pointer;
the distributed ledger transferring the delegate authorization token to a delegate party;
the delegate party transmitting a request to the data host platform to access the encrypted delegate data;
the data host platform, upon receiving the request to access the encrypted delegate data, encrypting the encrypted delegate data with the delegate asymmetric encryption algorithm to create twice-encrypted delegate data;
the data host platform transferring the twice-encrypted delegate data to the delegate party, the delegate party decrypting the twice-encrypted data using the delegate asymmetric encryption algorithm to produce the encrypted delegate data;

the delegate party decrypting the delegate access key using the delegate asymmetric encryption algorithm to produce the delegate key; and the delegate party decrypting the encrypted delegate data with the delegate key to access the data.

17. The method of claim 16, further comprising the issuing party and/or the receiving party executing a smart contract to revoke the authorization token from the receiving party and/or the delegate party, wherein revocation of the authorization token results in the denial of the request sent by the receiving party and/or the delegate party to the distributed ledger to access the encrypted data.

18. The method of claim 16, wherein the distributed ledger includes a policy engine for enforcing one or more policies with which the data transfer is compliant.

19. The method of claim 18, further comprising the data host platform consulting the policy engine to determine if a qualifying event has occurred prior to allowing the receiving party to access the data.

20. The method of claim 16, wherein the authorization token further includes an expiration time set by the issuing party, wherein the delegate authorization token further includes an expiration time set by the receiving party, wherein expiration of the authorization token results in the denial of the request sent by the receiving party and/or the delegate party to the distributed ledger to access the encrypted data.

* * * * *